United States Patent
Durland et al.

[11] 3,713,124
[45] Jan. 23, 1973

[54] TEMPERATURE TELEMETERING APPARATUS

[75] Inventors: Douglas H. Durland, Palo Alto; Robert J. Ehret, Los Altos, both of Calif.

[73] Assignee: Beckman Instruments, Inc.

[22] Filed: July 13, 1970

[21] Appl. No.: 54,161

[52] U.S. Cl. ............... 340/209, 340/195, 340/210, 340/208, 73/351, 340/207 R
[51] Int. Cl. .......................................... G08c 19/16
[58] Field of Search............. 340/209, 207, 208, 195; 73/351, 362 R, 362 AR; 323/75 H, 75 K; 331/66; 324/34 TE

[56] References Cited

UNITED STATES PATENTS

| | | | |
|---|---|---|---|
| 3,303,701 | 2/1967 | Matsuura et al. | 73/351 |
| 3,253,588 | 5/1966 | Vuilleumier et al. | 128/2 |
| 3,156,910 | 11/1964 | Tarbutton | 340/207 |
| 3,246,308 | 4/1966 | Matthews | 340/207 |
| 3,338,100 | 8/1967 | Takami | 340/195 |
| 3,268,880 | 8/1966 | Miller | 73/351 |
| 3,159,796 | 12/1964 | Sandwyk | 323/75 K |
| 3,085,194 | 4/1963 | Revesz | 323/75 K |
| 3,530,449 | 9/1970 | Andersen | 340/177 |

Primary Examiner—John W. Caldwell
Assistant Examiner—Robert J. Mooney
Attorney—Robert J. Steinmeyer and William F. McDonald

[57] ABSTRACT

Apparatus for providing, at a remote location, an indication of the temperature of a rotating body, such as the rotor of a centrifuge, comprising a closed loop feed-back circuit including a voltage controlled oscillator positioned remote from the rotor and a frequency sensitive bridge circuit mounted on the rotor. The bridge circuit includes a thermistor such that the balance frequency thereof is a function of the temperature of the rotor. The output of the voltage controlled oscillator is transmitted to the rotor where it excites the bridge circuit which generates an output signal whose amplitude is a function of the difference between the frequency of the oscillator and the balance frequency of the bridge circuit. The output signal from the bridge circuit is transmitted back to the remote location where it is applied, together with the output of the oscillator, to a phase sensitive detector which serves as an error detector to adjust the frequency of the voltage controlled oscillator to null the output of the bridge circuit. The output of the voltage controlled oscillator which is transmitted to the rotor is also used to energize a self-contained power supply thereby providing power for the rotor-mounted components. In addition, the output of the voltage controlled oscillator is modulated between two amplitude levels before transmission to the rotor-mounted components. When the oscillator output is high and the power supply on the rotor is drawing current, the detector is short-circuited. When the oscillator output is low and the power supply is discharging and not drawing current, the phase sensitive detector is operative.

5 Claims, 7 Drawing Figures

INVENTORS
DOUGLAS H. DURLAND
ROBERT J. EHRET

ATTORNEY

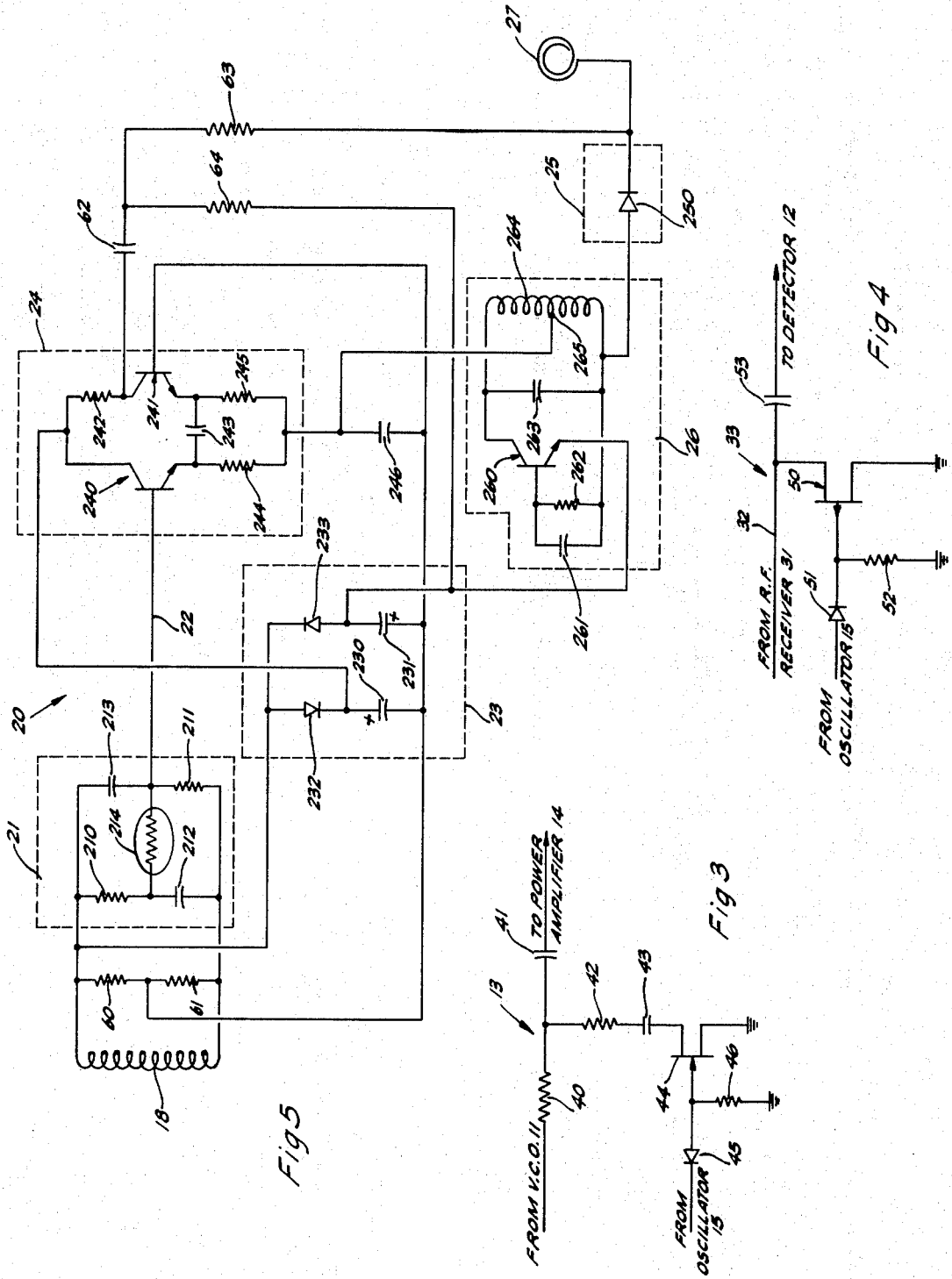

TEMPERATURE TELEMETERING APPARATUS

BACKGROUND OF THE INVENTION

1. Field of the Invention

The present invention relates generally to temperature telemetry and, more particularly, to apparatus for providing, at a remote location, an indication of the temperature of a rotating body, such as a centrifuge rotor.

2. Description of the Prior Art

Apparatus for providing a continuous indication of the temperature of a centrifuge rotor is required not only because the rotor temperature bears a predictable temperature relationship to the sample being centrifuged, but, also, since it is desirable that the rotor be maintained at a predetermined temperature during an investigative run. Previous methods developed to measure the temperature of a rapidly spinning body such as a centrifuge rotor have either been impractical for routine laboratory analysis or have had serious technical limitations. One widely used, indirect method was to measure the temperature before and after a run, make the assumption that the temperature varies linearly during the run and then inferentially calculate the temperature. However, this method has been proven to be highly unacceptable and inaccurate because the basic assumption that the temperature varies linearly has been shown to be often untrue.

Another prior art approach has been the use of infrared radiometry to measure the radiating energy emitted from the centrifuge rotor. However, such devices suffer from several limitations. First, the emissivity of the source, i.e., one of the rotor surfaces, must be known in order to accurately determine the temperature. This factor, however, is not controllable in an object such as a centrifuge rotor due to changes in the surface characteristics from handling, wear and tear, and so on. Secondly, some of the prior art devices require moving parts in the form of a rotating chopper blade interposed between the radiometer and the source to produce an A.C. signal. However, such rotating parts contribute toward the generation of erroneous readings.

Still another prior art approach obtains the rotor temperature directly by mounting a temperature sensing element, such as a thermistor or thermocouple, on the rotor. However, two major problems have been encountered in such systems. In the first instance, since the temperature sensing element is mounted on the rotating body itself, it is necessary to make electrical contact between the rotor and an external, stationary measuring circuit. Most prior art solutions to this problem have utilized rotating mechanical contacts, such as slip rings or mercury pools, which have required periodic replacement. Secondly, where the temperature sensing element is mounted on the rotor, if any signal processing, such as resistance determination or capacity determination is to be done in the rotor prior to feeding the signal to an external measuring circuit, it is necessary to have a power source on the rotor to operate the rotor-mounted components. The most typical solution to this problem is to mount a power supply such as a battery on the rotor itself. However, such batteries have had short lives requiring periodic replacement. In addition, there is a tendency for the batteries to break apart and disintegrate under the high speeds of the centrifuge.

Still another prior art approach obtains rotor temperature by mounting a temperature sensing element, such as a thermistor, on the rotor, and connecting it to the secondary of a rotary transformer, also mounted on the rotor. The resistance of the temperature sensing element, which is directly related to the rotor temperature, is then measured by measuring the impedance reflected by the loaded secondary of the rotary transformer into the stationary primary of this transformer. However, a major problem has been encountered with such systems. The transfer characteristics between the primary and the secondary of the rotary transformer have a large affect on the measured reflected impedance of interest. This is of major importance in an ultracentrifuge, where it is most difficult to maintain small air gaps, and even more difficult to maintain close tolerance air gaps, both of which are necessary to minimize the effect of the transformer electrical transfer path.

SUMMARY OF THE INVENTION

According to the present invention, there is disclosed apparatus for providing a continuous indication of the temperature of a centrifuge rotor which completely avoids the above-discussed problems in the prior art. The present system avoids the problems present with infrared radiometry and is independent of the characteristics of the electrical transfer path into and out of the rotor, which is of immeasurable value in a centrifuge where close tolerance air gaps are almost impossible to maintain. The present invention measures the temperature of the centrifuge rotor directly by mounting a temperature sensor in good thermal contact with the rotor itself. However, the need for rotating mechanical contacts, such as slip rings and mercury pools, which are now required for accurate thermistor resistance read-out, is entirely eliminated while retaining intimate contact between the temperature sensor and the rotor. In addition, the present system completely eliminates the necessity for a rotor-carried power source, such as batteries, with their attendant short life and structural problems.

Briefly, the present system for providing, at a remote location, an indication of the temperature of a rotating body, such as the rotor of a centrifuge, comprises a closed loop feed-back circuit including a voltage controlled oscillator positioned remote from the rotor and a frequency sensitive bridge circuit mounted on the rotor. The bridge circuit includes a thermistor such that the balance frequency thereof is a function of the temperature of the rotor. The output of the voltage controlled oscillator is transmitted to the rotor where it excites the bridge circuit which generates an output signal whose amplitude is a function of the difference between the frequency of the oscillator and the balance frequency of the bridge circuit. The output signal from the bridge circuit is transmitted back to the remote location where it is applied, together with the output of the oscillator, to a phase sensitive detector which serves as an error detector to adjust the frequency of the voltage controlled oscillator to null the output of the bridge circuit. The output of the voltage controlled oscillator which is transmitted to the rotor is also used to energize a self-contained power supply on the rotor thereby providing power for the rotor-mounted components. In addition, the output of the voltage controlled oscillator is modulated between two amplitude levels before transmission to the rotor-mounted components. When the oscillator output is high and the power supply on the rotor is drawing current, the detector is short-circuited. When the oscillator output is low and the power supply is discharging and not drawing current, the phase sensitive detector is operative.

It is therefore an object of the present invention to provide apparatus for generating a continuous indication of the temperature of a rotating body.

It is a further object of the present invention to provide a continuous indication of the temperature of a centrifuge rotor.

It is a still further object of the present invention to teach a system for providing a continuous indication of the temperature of a rotating body which is independent of the characteristics of the electrical transfer path into and out of the body.

It is another object of the present invention to teach apparatus for providing an indication of the temperature of a rotating body which eliminates rotating mechanical contacts such as slip rings or mercury pools while retaining intimate contact between the temperature sensor and the rotating body.

It is still another object of the present invention to teach apparatus for providing an indication of the temperature of a rotating body which eliminates the need for body-carried power sources, such as batteries.

Still other objects, features and attendant advantages of the present invention will become apparent to those skilled in the art from a reading of the following detailed description of the preferred embodiment constructed in accordance therewith, taken in conjunction with the accompanying drawings wherein like numerals designate like parts in the several figures and wherein:

BRIEF DESCRIPTION OF THE DRAWINGS

FIGS. 3 and 4 are schematic circuit diagrams of portions of the system of FIG. 1;

FIG. 5 is a schematic circuit diagram of the rotor-mounted components of the system of FIG. 1.

DESCRIPTION OF THE PREFERRED EMBODIMENT

Figure 1:
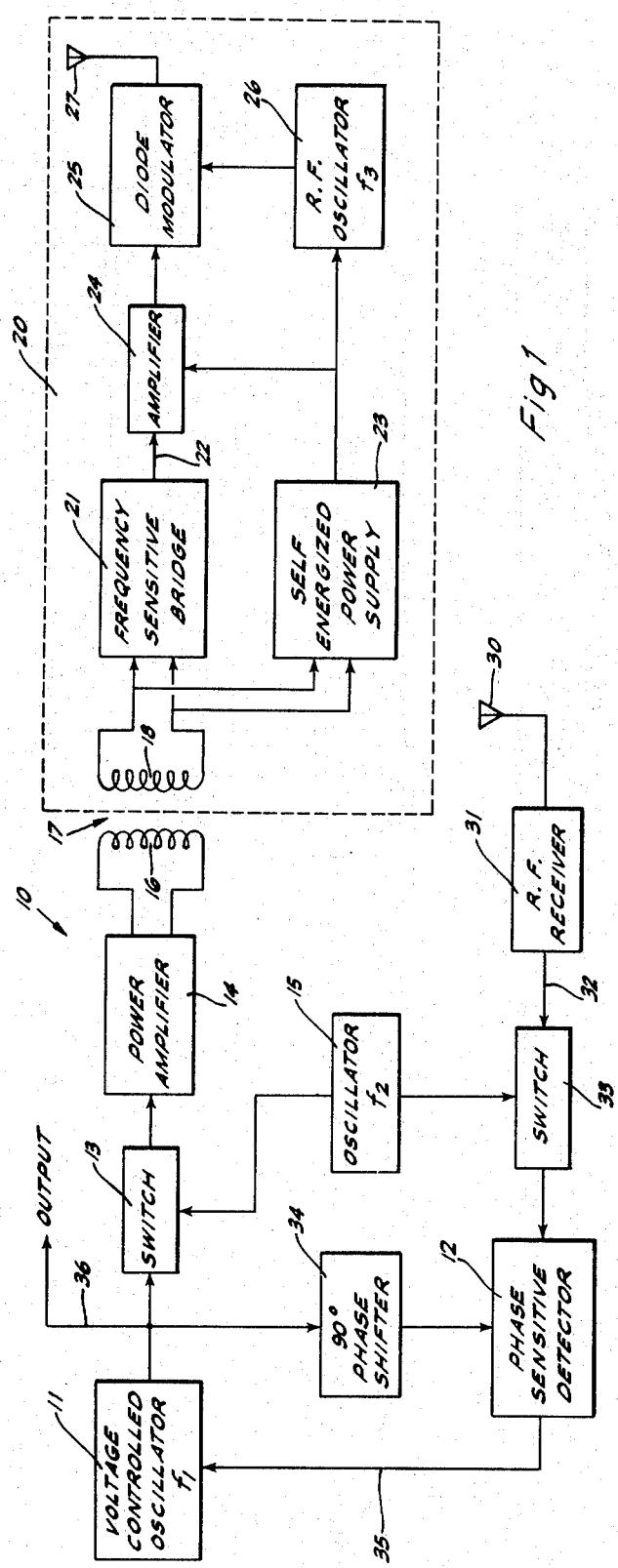
FIG. 1 is a block diagram of the preferred embodiment of the present invention.
Figure 2B:
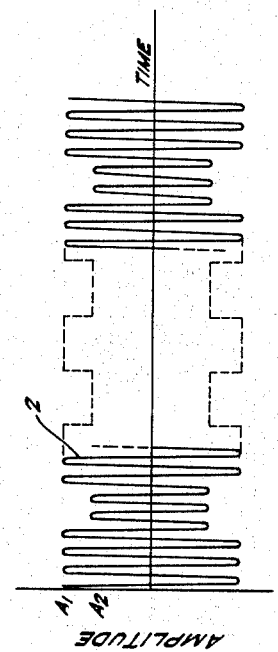
FIGS. 2a and 2b are waveforms useful in explaining the operation of the embodiments of FIG. 1.
Figure 2A:
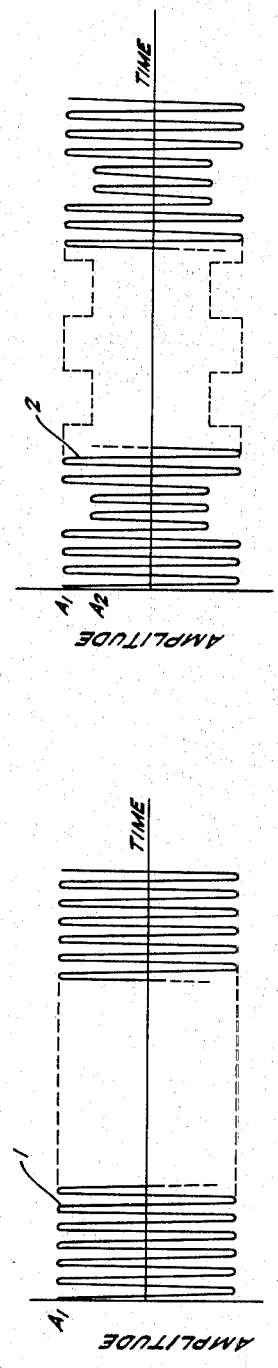

Referring now to the drawings and, more particularly, to FIGS. 1, 2a and 2b thereof, there is shown a preferred embodiment of apparatus for providing, at a remote location, an indication of the temperature of a rotating body. Since the preferred environment for the present temperature telemetering system is in the measurement of the temperature of the rotor of a centrifuge, the present invention will be described in that environment. However, it will be apparent to those skilled in the art that the present invention has wider applicability and may be used for the measurement of the temperature or other physical quantities of a body without physical contact.

The present system, generally designated 10, uses radiotelemetry and a closed loop feed-back circuit to provide an accurate indication of the temperature of the body without making a mechanical connection between the body and a stationary body. More specifically, the present system includes an adjustable voltage controlled oscillator 11 operating at a variable frequency $f_1$ which is controlled by the output from a phase sensitive detector 12. The output of voltage controlled oscillator 11 appears as waveform 1 in FIG. 2a and is seen to be a sinusoidal signal of frequency $f_1$ and fixed amplitude $A_1$. The output of voltage controlled oscillator 11 is applied via a switch 13 to the input of a power amplifier 14. For reasons which will appear more fully hereinafter, switch 13 is controlled by an oscillator 15 operating at a frequency $f_2$, where $f_1$ is several orders of magnitude greater than $f_2$. For purposes of example, voltage controlled oscillator 11 may operate in the range of 14–55 kHz whereas oscillator 15 may be a source of line voltage at 60 c.p.s. In any event, switch 13 is operative to pass the output of voltage controlled oscillator 11 to power amplifier 14, without alteration, during half of the cycle of frequency $f_2$ and to partially short the output of oscillator 11 during the remaining half cycle of frequency $f_2$. Accordingly, the output of switch 13 appears as waveform 2 in FIG. 2b and is seen to be a sinusoidal signal of constant frequency $f_1$ whose amplitude periodically switches between amplitudes $A_1$ and $A_2$ at frequency $f_2$.

Power amplifier 14 amplifies the signal from switch 13 and applies such signal to the opposite ends of a primary 16 of an output transformer 17. As will be explained more fully hereinafter, primary 16 of transformer 17 is mounted in close proximity to the centrifuge rotor so that the signal in primary 16 is transmitted to the rotor where it is received by the secondary 18 of transformer 17. In FIG. 1, dotted block 20 indicates those components mounted on the rotor. In the present case, secondary 18 is mounted so as to be always parallel to and coaxial with primary 16 so that there is continuous coupling between primary 16 and secondary 18 even though secondary 18 is rotating with the rotor.

The output of secondary 18 of transformer 17 is applied to the input of a frequency sensitive bridge circuit 21. Frequency sensitive bridge circuit 21 includes a thermistor (not shown) as an active element thereof. The thermistor is placed in good thermal contact with the rotor so that its resistance is an accurate indication of the temperature thereof. As will be explained more fully hereinafter with reference to FIG. 5, the thermistor tunes frequency sensitive bridge 21 so that at a given excitation frequency, the output of bridge 21 on a line 22 will be zero. As the excitation frequency of bridge circuit 21 varies from the balance frequency thereof, bridge 21 generates an output on line 22 whose amplitude is directly proportional to the difference between the excitation frequency and the balance frequency. The frequency of the output on line 22 is the same as the excitation frequency but the phase is such relative to the phase of the excitation frequency that it is indicative of whether the excitation frequency is greater or less than the balance frequency.

The output of frequency sensitive bridge 21 on line 22 therefore appears similar to waveform 2 in FIG. 2b although the amplitude thereof will vary in accordance with the difference between the excitation frequency $f_1$ and the balance frequency of bridge 21. The output on line 22 is amplified by an amplifier 24 and applied to a diode modulator 25. Diode modulator 25 also receives an input from an R.F. oscillator 26 operating at a frequency $f_3$ which is several orders of magnitude higher than frequency $f_1$. By way of example, $f_3$ may be equal to 3 MHz. In this manner, the output of frequency sensitive bridge 21 modulates the output of oscillator 26, such modulated signal being applied to a transmitting antenna 27.

Secondary 18 of transformer 17 also feeds a self-energized power supply 23 which is used to supply power for rotor-mounted components 20. More specifically, power supply 23 provides power for amplifier 24 and R.F. oscillator 26. As will be explained more fully hereinafter, power supply 23 includes a charging circuit which is charged by secondary 18 of transformer 17. If such charging circuit were operative at all times, it would tend to distort the sinusoidal signal appearing across secondary 18 of transformer 17. Oscillator 15 in combination with switch 13, however, permits an undistorted sinusoidal input to be applied to frequency sensitive bridge 21. More specifically, during the half cycle that the output of power amplifier 14 is at the higher level $A_1$, power supply 23 draws current, thereby distorting the output across secondary 18. During the alternate half cycle, when the output of power amplifier 14 drops to level $A_2$, power supply 23 is charged and does not draw current, leaving an undistorted waveform to excite bridge 21. During such alternate half cycle, power supply 23 retains sufficient energy to supply amplifier 24 and R.F. oscillator 26.

The signal transmitted by antenna 27 is received by a receiving antenna 30. As will be explained more fully hereinafter, antenna 30 is located in close proximity to the rotor so that there is constant coupling between antennas 27 and 30. The signal from antenna 30 is applied to an R.F. receiver 31 which amplifies the signal and removes the R.F. component therefrom, thereby producing, on a line 32, a replica of the signal on line 22. The signal on line 32 is applied via a switch 33 to a first input of phase sensitive detector 12. Switch 33 receives an input from oscillator 15 and, as will be explained more fully hereinafter, is operative to short the output of R.F. receiver 31 during the time period that the output of power amplifier 14 is at the higher level $A_1$. Therefore, when power supply 23 is drawing current and distorting the input to bridge circuit 21, the receiving circuits of the present system are disabled. On the other hand, during the alternate half cycle, when bridge circuit 21 receives an undistorted signal from secondary 18 of transformer 17, the output of R.F. receiver 31 is applied to phase sensitive detector 12.

Phase sensitive detector 12 receives a reference signal from voltage controlled oscillator 11 via a 90° phase shifter 34. Phase sensitive detector 12 is operative to provide a D.C. signal on a line 35 whose magnitude is directly proportional to the difference frequency $f_1$ and the balance frequency of bridge 21 and whose sign is indicative of whether frequency $f_1$ is greater or less than the balance frequency of bridge 21. For this purpose, phase sensitive detector 12 may be a balanced symmetrical detector of known configuration which provides an output, the polarity and magnitude of which depends on the magnitude and sense of the input signals. A 90° phase shifter 34 is inserted between the output of voltage controlled oscillator 11 and the input of phase sensitive detector 12. This is necessary because the bridge output signal is shifted by 90° from the applied signal.

In operation, if the output frequency of oscillator 11 is at the balance frequency of bridge 21, then the output of bridge 21 on line 22 will be zero and the output of phase sensitive detector 12 will also be zero. If oscillator 11 has any other frequency, the output of bridge 22 will be non-zero and this signal will be applied to the first input of phase sensitive detector 12. Phase sensitive detector 12, using the output of voltage controlled oscillator 11 via phase shifter 34 as a reference, will determine the direction of misalignment of the output of oscillator 11 and will adjust the polarity of its D.C. output signal on line 35 accordingly. The amplitude of the output on line 35 will simply be proportional to the amplitude of the signal on lines 22 and 32 which is indicative of the magnitude of the difference between frequency $f_1$ and the balance frequency of bridge 21. Accordingly, the D.C. signal on line 35 is applied to voltage controlled oscillator 11 to adjust the frequency thereof until the D.C. signal is reduced to zero. Thus, there is a unique null-balanced condition which will vary with the temperature of the thermistor on the rotor and system 10 operates to adjust the frequency of oscillator 11 until such null-balance condition is achieved. When the output of detector 12 is reduced to zero, the frequency of oscillator 11 corresponds to the temperature of the thermistor and an indication of such temperature may be derived by measuring the frequency of the output of oscillator 11 on line 36 with the system at null.

Referring now to FIG. 3, there is shown a preferred embodiment for switch 13 which operates to partially short the output of oscillator 11 during alternate half cycles of the signal from oscillator 15. More specifically, connected in the line between oscillator 11 and power amplifier 14 may be the series connection of a resistor 40 and an isolation capacitor 41. The junction between resistor 40 and capacitor 41 is connected via a resistor 42 and a second isolation capacitor 43 to the drain or source electrode of a field effect transistor 44, the other of the drain or source electrode being connected to ground. The gate electrode of field effect transistor 44 receives the signal from oscillator 15 via a diode 45. A biasing resistor 46 is connected between the gate electrode of transistor 44 and ground.

In operation, during the half cycle when the output of oscillator 15 is negative, diode 45 conducts which biases field effect transistor off such that transistor 44 does not conduct. At this time, the signal from voltage controlled oscillator 11 passes unaltered through resistor 40 and capacitor 41 to power amplifier 14. On the other hand, during the alternate half cycle when the output of oscillator 15 is positive, diode 45 is back-biased turning transistor 44 on. At this time, resistors 40 and 42 operate as a voltage divider network passing only a portion of the signal from oscillator 11 through capacitor 41 to power amplifier 14.

Referring now to FIG. 4, the corresponding circuit components for switch 33 are shown. More specifically, switch 33 includes a field effect transistor 50, the drain and source electrodes being connected between line 32 and ground. The gate electrode of transistor 50 receives the output from oscillator 15 via a diode 51. A bias resistor 52 may be connected between the gate electrode of transistor 50 and ground. Finally, line 32 is connected via an isolation capacitor 53 to detector 12.

In operation, during the half cycle when the output of oscillator 15 is negative, diode 51 is back-biased, causing transistor 50 to conduct, thereby completely shorting line 32 to ground. As explained previously with reference to FIG. 3, during this same half cycle, transistor 44 is nonconducting and the full output from voltage controlled oscillator 11 is applied to power amplifier 14. Accordingly, during this half cycle, when power supply 23 is drawing current and distorting the input to bridge circuit 21, the output of receiver 31 is shorted to ground. During the alternate half cycle, when the output of oscillator 15 is positive, diode 51 is forward biased and transistor 50 is nonconductive. At this time, the output from receiver 31 is permitted to pass through capacitor 53 to detector 12. As explained previously with reference to FIG. 3, during this alternate half cycle, diode 45 and transistor 44 are conductive and a reduced amplitude signal is applied to frequency sensitive bridge 21. Accordingly, during the time that power supply 23 does not draw current and an undistorted signal is applied to bridge 21, the output from receiver 31 is passed directly to detector 12.

Referring now to FIG. 5, there is shown a preferred embodiment for the rotor-mounted components 20. More specifically, frequency sensitive bridge 21 comprises a pair of resistors 210 and 211 and a pair of capacitors 212 and 113 connected as four arms of the bridge. The input terminals of the bridge are connected to the opposite ends of secondary 18 of transformer 17. In addition, a thermistor 214 is connected between two terminals of bridge 21. As explained previously, thermistor 214 is placed in good thermal contact with the rotor so that its resistance varies in accordance with the temperature thereof. Thermistor 214 is operative to tune bridge 21 so that the balance frequency thereof is a function of the temperature of the rotor. As long as the frequency of the excitation signal across secondary 18 of transformer 17 is at the balance frequency of bridge 21, the output of bridge 21, across thermistor 214, will be zero. At any other frequency, bridge 21 generates an output on line 22, connected to one end of thermistor 214. This output on line 22 is applied to a conventional two-stage amplifier 24 consisting of first and second transistor stages 240 and 241. The signal on line 22 is applied to the base of transistor 240. The emitters of transistors 240 and 241 are connected by a capacitor 243 and a pair of resistors 244 and 245.

Amplifier 24 receives power from self-energized power supply 23. More specifically, self-energized power supply 23 includes a pair of capacitors 230 and 231, the negative side of capacitor 230 and the positive side of capacitor 231 being connected to the junction between a pair of voltage dividing resistors 60 and 61 connected across secondary 18 of transformer 17. The remaining ends of capacitors 230 and 231 are connected via oppositely poled diodes 232 and 233, respectively, to one end of secondary 18 of transformer 17. Because of the opposite polarity of diodes 232 and 233, capacitor 230 is charged during one-half cycle of the excitation signal on secondary 18 whereas capacitor 231 is charged during the alternate half cycle. In this manner, the junction between capacitor 230 and diode 232 provides a source of positive reference potential and the junction between capacitor 231 and diode 233 provides a source of negative reference potential. The junction between capacitors 230 and 231 may be considered to be the reference potential such as ground. The positive source of reference potential is connected to the junction between resistor 242 and the collector of transistor 240 in amplifier 24. In addition, the reference potential, at the junction between capacitors 230 and 231, is connected to the base of transistor 241 and to the junction between resistors 244 and 245 via a capacitor 246. Accordingly, transistor 240 receives and amplifies the output of bridge 21 on line 22 and couples the amplified signal via capacitor 243 to transistor 241 which further amplifies the signal and directs it via a capacitor 62 and a resistor 63 to diode modulator 25. A bias resistor 64 is also connected between the junction of resistor 62 and capacitor 63 and the source of negative reference potential.

Power supply 23 further provides power for R.F. oscillator 26, a typical circuit diagram being shown in FIG. 5. More specifically, oscillator 26 may include a transistor 260, the emitter of which receives the negative potential from power supply 23. The base of transistor 260 is connected to one end of a parallel circuit consisting of a capacitor 261 and a resistor 262 whereas the collector of transistor 260 is connected to one end of a parallel circuit consisting of a capacitor 263 and an inductor 264. The other ends of the two parallel circuits are connected together. A tap 265 on inductor 264 is connected via capacitor 246 to the reference potential between capacitors 230 and 231. Capacitor 246 serves to isolate the high frequency of oscillator 26 from the remaining circuitry.

In operation, oscillator 26 has a resonant frequency determined by the values of the circuit components, the output of which is taken from the junction between capacitor 263 and inductor 265 and applied to a diode 250 in diode modulator 25. The output of frequency sensitive bridge 21 is applied via amplifier 24 also to diode modulator 25. The resultant amplitude modulated signal is radiated by antenna 27 to receiving antenna 30.

Figure 6:
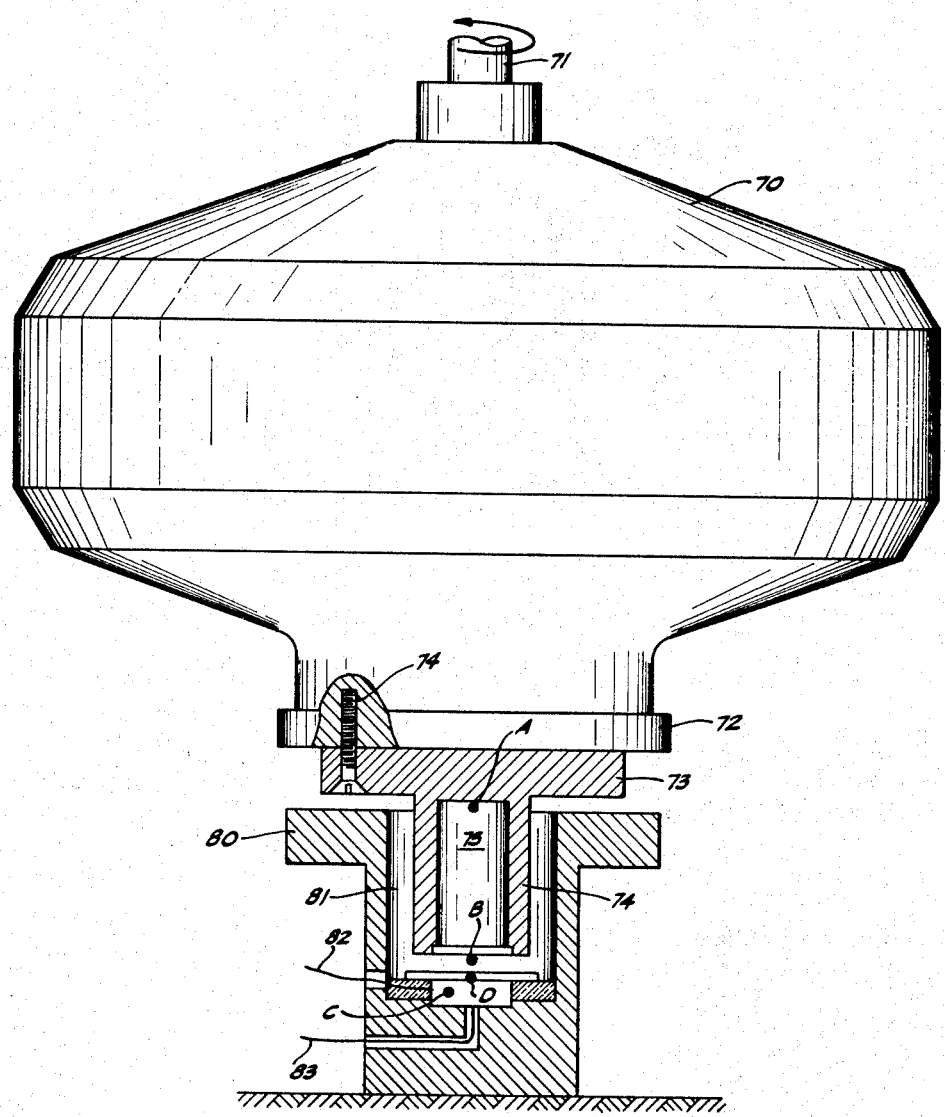
FIG. 6 is a plan view of a typical centrifuge rotor showing the manner of using the present system therewith.

Referring now to FIG. 6, system 10 may be used to measure the temperature of a centrifuge rotor 70 which is driven by a shaft 71 by means not shown. For purposes of example, rotor 70 may include a flat base 72. According to the present invention, a special adaptor 73 may be connected to base 72 of rotor 70 by screws 74. Adaptor 73 may be made of aluminum or some other good heat conducting material so as to follow the temperature of rotor 70. Adaptor 73 includes a hollow cylindrical section 74 having a cavity 75. According to the present invention, thermistor 214 may be positioned in cavity 75 at a point A in thermal contact with adaptor 73. The remaining rotor-mounted components 20 may all be positioned within cavity 75 and secured therein by means of a thermally conductive epoxy to thereby provide great mechanical rigidity. Antenna 27, as well as secondary 18 of transformer 17, may be positioned at a point B at the outer extremity of cavity 75. Secondary 18 of transformer 17 would simply be a coil whose axis is aligned with the axis of rotation of rotor 70 whereas antenna 27 may be a similar coaxial coil or a group of radial wires. In any event, since the frequencies of the signals in secondary 18 and antenna 27 are substantially different, no interference therebetween occurs.

In order to transmit to secondary 18 and to receive from antenna 27, there is provided a stationary support 80 including an elongated chamber 81 into which section 74 of adaptor 73 extends. At the base of chamber 81, at a point C, is mounted the primary 16 of transformer 17 which, again, would be a coil positioned coaxially with the axis of rotation of rotor 70. Also positioned in the base of cavity 81, at a point D, would be receiving antenna 30, which may be a coil or a group of radial wires. The signal from power amplifier 14 is conducted via a lead 82 to primary 16 of transformer 17 whereas the output from antenna 30 is conducted via a lead 83 to R.F. receiver 31.

It can therefore be seen that in accordance with the present invention, there is disclosed a system for providing a continuous indication of the temperature of a rotating body, such as a centrifuge rotor, which completely avoids the previously discussed problems of the prior art. By avoiding the use of infrared radiometric techniques, and by avoiding circuitry which is power supply level dependent, the present system is independent of rotor emissivity and of the characteristics of the electrical transfer path into and out of the rotor, which is of immeasurable value in a centrifuge where close tolerance air gaps are almost impossible to maintain. The present invention measures the temperature of the rotating body directly by mounting a temperature sensor in good thermal contact with the rotor itself. However the need for rotating mechanical contacts, such as slip rings or mercury pools, is entirely eliminated while retaining intimate contact between the temperature sensor and the rotor. In addition, the present system completely eliminates the necessity for a rotor-carried power source, such as batteries, with their attendant short life and structural problems. Instead, the present system utilizes a closed loop feedback circuit including a voltage controlled oscillator positioned remote from the rotor and a frequency sensitive bridge circuit mounted on the rotor. The output of the voltage controlled oscillator is used not only to excite the bridge circuit during one-half cycle of the line frequency, but is also used to supply excitation for a self-energized power supply during alternate half cycles of the line frequency. The output of the bridge circuit is transmitted to a phase sensitive detector which compares the output of the voltage controlled oscillator and the output of the bridge circuit to adjust the frequency of the oscillator to reach a null condition. Read-out is then accomplished by measuring the frequency of the oscillator with the system at null.

While the invention has been described with respect to the preferred physical embodiment constructed in accordance therewith, it will be apparent to those skilled in the art that various modifications and improvements may be made without departing from the scope and spirit of the invention. For example, it will be apparent to those skilled in the art that the present invention is applicable to providing a frequency null remote indication of any parameter of an inaccessible rotating body which can be transformed to a capacitance, inductance or resistance, i.e., pressure, strain, electrical conductivity, etc. It is also obvious that the present invention may be used in conjunction with a separate control system such as the temperature control system of a centrifuge. In such a case, the present system would provide an ideal reference signal for the controlling the rotor temperature. Accordingly, it is to be understood that the invention is not to be limited by the specific illustrative embodiments, but only by the scope of the appended claims.

We claim:

1. Apparatus for providing at a remote location an indication of the temperature of a body comprising:
    generating means at said remote location for generating a first signal of selectively variable frequency having at least first and second amplitude components;
    means electrically connected to said generating means for transmitting said first signal to said body;
    receiving means on said body for receiving said first signal;
    temperature responsive bridge circuit means on said body, having a null balance output frequency which varies as a function of the temperature of said body, electrically connected with said receiving means for producing in response to the first amplitude components of said first signal a second signal which is a function of the frequency difference between said first signal and the null balance output frequency;
    power supply means on said body electrically connected with said receiving means for producing only in response to the second amplitude components of said first signal energizing signals for electrical circuits on said body; and
    detecting means associated with said bridge circuit means for detecting in response to said second signal the temperature of said body.

2. Apparatus according to claim 1 wherein said detecting means includes first antenna means on said body for transmitting said second signal;
    second antenna means at said remote station for receiving said second signal; and
    frequency adjusting means connected between said receiving antenna means and said generating means for varying the frequency of said generating means to null said second signals so that the frequency of said first signal at said null condition represents the temperature of said body.

3. Apparatus according to claim 2 wherein said bridge circuit means comprises an impedance bridge having a thermistor connected in circuit therewith, with said thermistor being positioned in heat receiving relationship with said body to sense the temperature thereof.

4. Apparatus according to claim 3 wherein said first signal has at least high and low amplitude components, with said bridge circuit means being responsive to said low amplitude components and said power supply means being responsive only to said high amplitude components.

5. Apparatus according to claim 4 wherein said power supply means includes at least one capacitor adapted to be charged only by high amplitude components of said first signal so that the bridge circuit means receives an undistorted waveform of said first signal during intervals when only said low amplitude components are present therein.

* * * * *